United States Patent [19]

Polák

[11] 4,152,228

[45] May 1, 1979

[54] METHOD FOR REDUCING ELECTROLYTIC INTERFERENCE WITH METAL STRUCTURES

[75] Inventor: Josef Polák, Prague, Czechoslovakia

[73] Assignee: Chemoprojekt, Prague, Czechoslovakia

[21] Appl. No.: 823,388

[22] Filed: Aug. 10, 1977

[30] Foreign Application Priority Data

Sep. 22, 1976 [CS] Czechoslovakia ................ 6147/76

[51] Int. Cl.² ............................................ C23F 13/00
[52] U.S. Cl. .................................... 204/147; 204/148; 204/197; 204/198
[58] Field of Search ...................... 204/147, 197, 148

[56] References Cited

U.S. PATENT DOCUMENTS 2,943,027  6/1960  Schaschl et al. ................ 204/197
4,080,565  3/1978  Polák et al. ..................... 204/147

OTHER PUBLICATIONS

Parker, Pipe Line Corrosion & Cathodic protection (1962), pp. 106–123.

Primary Examiner—Howard S. Williams
Attorney, Agent, or Firm—Burgess, Ryan and Wayne

[57] ABSTRACT

A parallel galvano-electrolytic current path is provided to conduct a current comprising (i) a portion of the interfering current and (ii) currents arising due to varying degrees of polarization of metal surfaces. The current is measured and a variable resistor inserted in the galvanic path is reduced in value until zero current flows through the parallel galvano-electrolytic current path in the direction of the electrolytic portion of said galvano-electrolytic path. Also disclosed is a circuit for applying said method.

3 Claims, 3 Drawing Figures

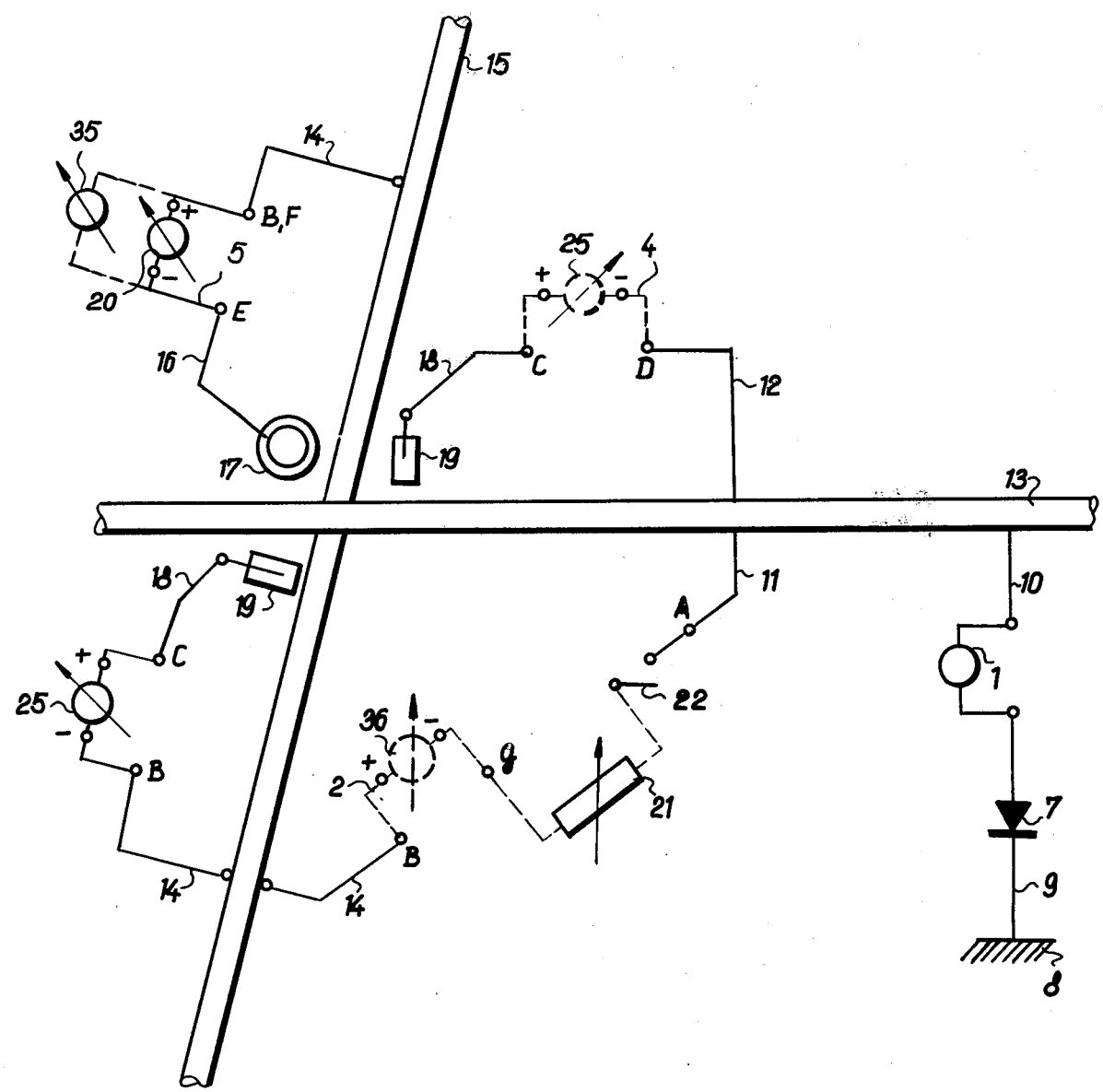

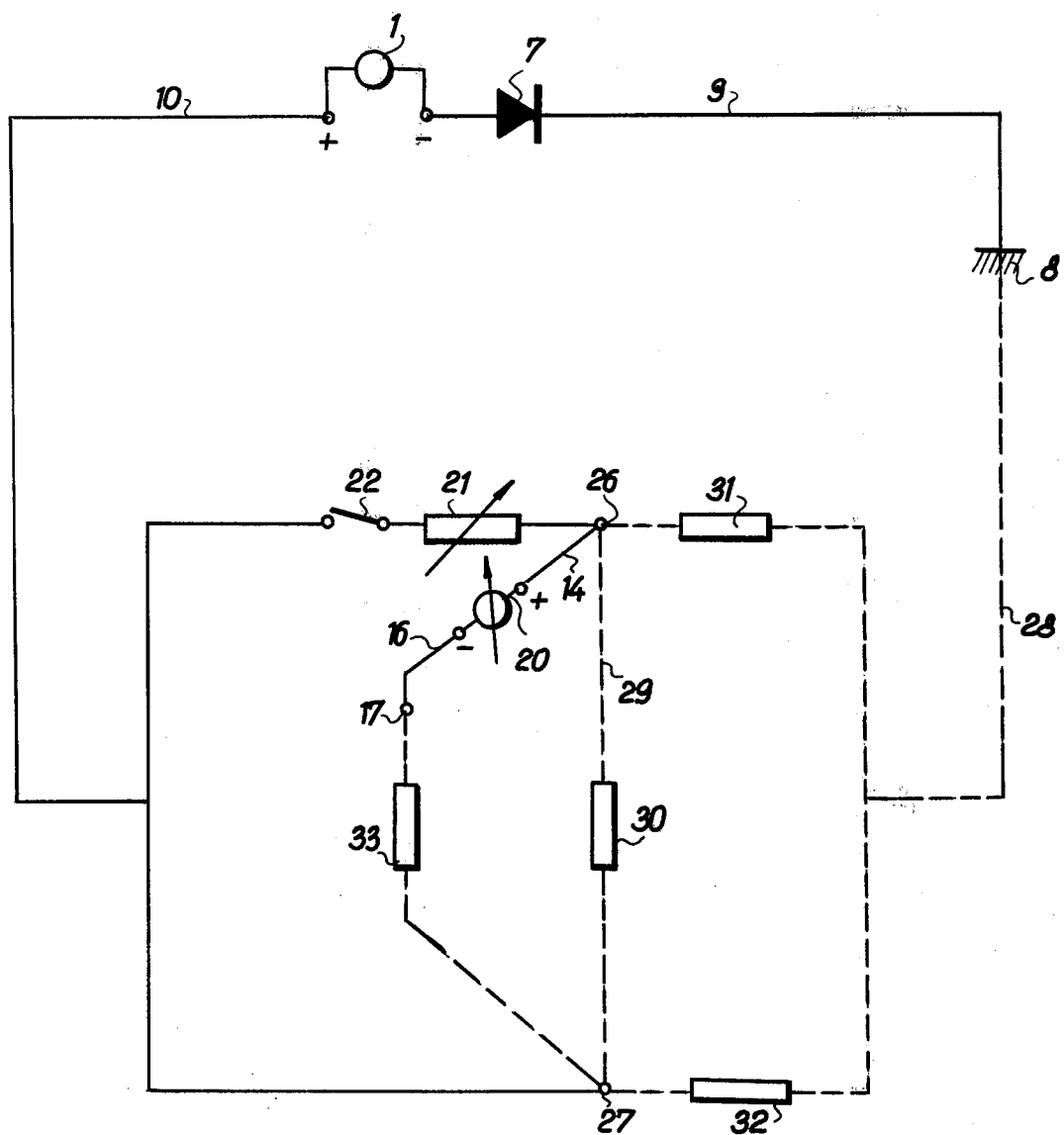

METHOD FOR REDUCING ELECTROLYTIC INTERFERENCE WITH METAL STRUCTURES

BACKGROUND OF THE INVENTION

The invention relates to a method and apparatus for reducing electrolytic interference with metal structures provided with external insulating coating and embedded in electrolyte in a foreign direct-current field produced by a cathodic protection electric circuit or by dynamic stray currents.

When facilities for cathodic protection of buried steel structures are in operation, a protective current flows from an auxiliary anode through the ground to the surface of the structure being protected which constitutes a cathode. When other, foreign metal structures are situated in the protective current path, a part of said current enters such structures and is discharged into the ground at another point to continue its flow to the cathode. As regards the foreign structures, the said part of the protective current acts as stray current. It uses the foreign structures, such as pipelines and cables, as electric conductors and at points where it leaves the structure to the ground it causes the structure to corrode. In principle, it is unimportant whether the current results from the operation of cathodic protection systems (with external current supply or with galvanic anodes) or whether it comprises dynamic stray currents which flow from one line structure to another and the source of which are, in the first place, d.c.-electrified railroad facilities with negative pole earthed. The magnitude of the current drained from the structure to ground per unit area of the structure is a measure of significance of the corrosion process.

The lengthwise flow of the interfering current to remote areas where it leaves the foreign structures to the ground usually requires detailed measurements over extensive sections of the line structure to find the critical spot, i.e., the geographic point of the most adverse effect of the electrolytic phenomenon, which corresponds with the point where the greatest part of the interfering (stray) current is discharged from the foreign metal line structure.

When the existence of interference has been detected and when the point of the most adverse effect of interference has been found, the next step is to design provisions for eliminating or mitigating the interference. In principle, these provisions consist of preventing uncontrolled discharge of the interfering current to the ground through holidays in the coating of the foreign structure.

The widely used method of interference bonding always has a certain favorable effect on the foreign structure exposed to interference and is always accompanied by a certain adverse effect on the interfering, cathodically protected structure. The degree of favorable or adverse effect is determined by a number of factors such as, for instance, the distance of the auxiliary anode (groundbed) from the foreign structure, the rectifier voltage and current and the transition (coating) resistance of the two structures. In extreme cases of interference, the current required for the interference bond may amount to as much as 40% or even 70% of the output of the cathodic protection installation to provide cathodic protection for the remote sections of the foreign line structure when its protective coating is poor or its surface bare. This necessitates raising the output voltage of the rectifier by as much as 200% if the same level of cathodic protection is to be provided for the interfering structure as in the absence of the interference bond.

DESCRIPTION OF THE PRIOR ART

The measure of interference suppression used up to the present in the so-called natural potential criterion, the result of this method being that the structure/electrolyte potential of the structure exposed to interference, e.g., pipe/soil potential, is restored to its original or natural value present at the critical point (hot spot) before the potential was shifted in a positive direction through the action of interference currents.

The presently used method of interference mitigation by measuring potential changes with cathodic protection on and off by means of a copper sulfate electrode placed on the ground surface over the crossing point has a number of disadvantages:

When applying the criterion used at present, the interference causes appreciable corrosion if the positive potential shift $$U_{off} - U_{on} > 100 \, mV;$$

A greater part of the potential values measured in this manner, however, represents the IR drop in the soil which is proportional to soil resistivity. The holidays in the pipeline coating at which the potential is measured with respect to a reference electrode may be quite distant from the area of apparent maximum exposure at the crossing point. The considerable IR drop in the soil between the distant coating holiday and the reference electrode resulting from the flow of protective current to the holidays in the coating of the cathodically protected pipeline may lead to erroneous conclusion that the current is discharged from the foreign interfered structure at the very crossing point. The final result is an undesirable rise of the current flowing through the interference bond and loading of the cathodic protection installation more than is necessary for correct mitigation of interference; in other cases the situation may be contrary.

The requirements posed on the interference bond are determined on the basis of the adverse effect of interference and of the favorable effect of the bond expressed in terms of the pipe/soil potential at the critical point. The so-called method of coupling resistances is usually applied when taking the necessary measurements and when designing the interference bond. The measurement of the structure/soil potential and of the driving voltage between the protected and foreign structures for diverse current conditions is most tedious, the calculation of the interference bond resistance is rather complicated and the resulting values are very often unrealistic due to errors occurring in the measurements; when inserted into the derived equations, these values yield results which do not justify the effort that was expended.

In cases where interference current must be drained from several foreign structures, such as pipelines or cables, to the cathodically protected structure, the design of interference bonds is rather complicated due to the interactive influence of the interference bonds on the current conditions in other structures. The current, potential change and driving voltage values obtained by measurement are used in solving a system of equations respecting the interference effect, the protective effect of the interference bonds and the interactive effect of the interference bonds. Next, the resistance values of the individual interference bonds are determined and another cycle of measurements is carried out with variable resistors in the individual intererence bonds set to the correct values. The measurements and calculations are substantially more complicated and time consuming than in the case of single bond design.

PRINCIPLE OF THE INVENTION

The shortcomings described above are eliminated by the method of mitigating interference on metal structures embedded in electrolyte in the presence of a foreign current field and by using the circuit devised for implementing said method which are the objects of this invention.

The method of mitigating interference on metal structures embedded in electrolyte in the presence of a foreign direct current field by draining the interference current through a galvanic path with variable resistance in accordance with this invention consists in establishing a parallel galvano-electrolytic current path to conduct a current comprising a portion of the interfering current and by currents arising due to varying degrees of polarization of metallic surfaces, the said current being measured and a variable resistance inserted in the galvanic path being reduced in value until zero current flows through said parallel galvano-electrolytic current path in the direction of the electrolytic portion of said galvano-electrolytic path. The method of this invention may also be implemented by establishing a parallel galvano-electrolytic current path immediately before the measurement point in a manner such that the sum of the galvanic currents arising due to varying degrees of polarization of metallic surfaces equals zero. The method of this invention may also be applied by measuring the current comprising a portion of the interference current or stray current flowing through said parallel galvano-electrolytic current path and by simultaneously measuring the interfered structure/electrolyte potential over a time interval of several hours, the variable resistance of said galvanic current path being gradually reduced until zero average value of current in the direction of the electrolytic portion of said parallel galvano-electrolytic current path is attained over a predetermined time interval and the average potential value is more negative than −0.75 V with respect to a copper sulfate electrode.

The method of the invention is accomplished using a circuit the principle of which is in that the interfering structure is galvanically connected to the first and fourth terminals of a test unit, the structure exposed to interference is galvanically connected to the second terminal, an auxiliary metal electrode is galvanically connected to a fifth terminal, a copper sulfate reference electrode is galvanically connected to the third terminal of said test unit, a milliammeter is series-connected between the fifth and sixth terminals, and a variable resistor and switch are connected in series between the first and seventh terminals of said test point, galvanic connections being provided between the second and sixth terminals as well as between the second and seventh terminals of said test unit. A circuit in accordance with the invention may also be accomplished by a series-connecting a high-resistance voltmeter to the second and third terminals of the test unit.

DESCRIPTION OF THE DRAWINGS

The attached FIG. 1 shows a diagram of connection in conformity with this invention at a crossing point of two pipelines.

Figure 2:
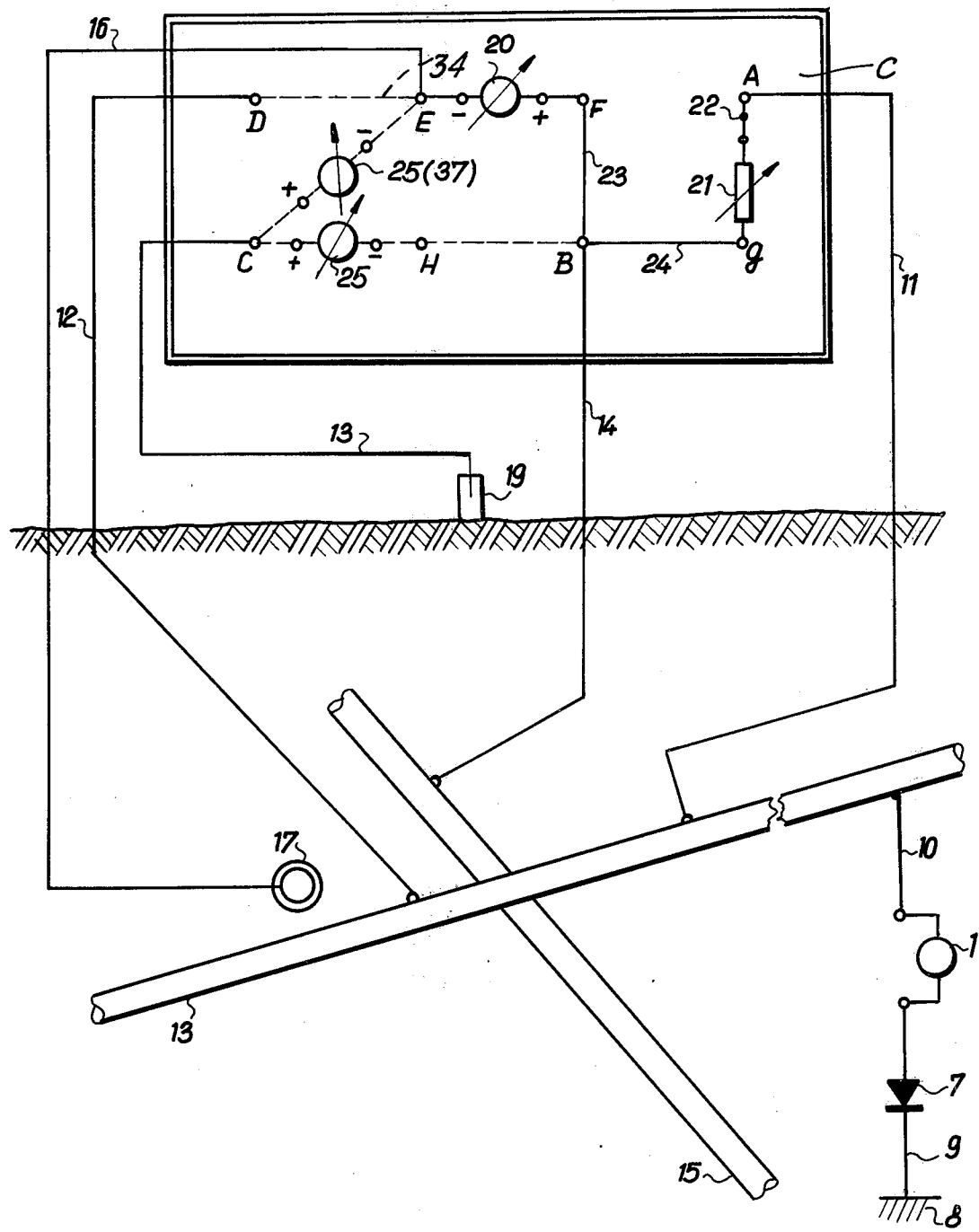
FIG. 2 illustrates the same case as practically accomplished in the field.

Pipeline 13 provided with external insulating coating is connected with a cathodic protection installation consisting of rectifier 7, auxiliary anode (groundbed) 8, automatic current interrupter 1 the positive pole of which is connected via connecting wire 10 with pipeline 13 while its negative pole is connected to rectifier 7, said rectifier being connected via connecting wire 9 with the auxiliary anode (groundbed) 8. An aboveground test station 6 fitted with instrument terminals A, B, C, D, E, F, G, H is provided at the crossing point of the interfering line 13 with the interfered line 15. The cathodically protected pipeline 13 is connected via galvanic connection 11, e.g. a cable, to terminal A of the test station 6, another galvanic connection 12 being provied between said pipeline 13 and terminal D. The pipeline exposed to interference 15, likewise provided with an external insulating coating, is connected via galvanic connection 14, e.g. a cable, to terminal B. An auxiliary metal electrode 17 is connected to terminal E of the test station 6 via galvanic connection 16. A sensor of this invention, e.g., a circular steel plate with one side insulated, with area $S=100$ cm$^2$, is buried in the depth of the axis of the interfered pipeline 15 at a distance of 0.3 to 5 m from the crossing point and from the two pipelines 13, 15. The copper sulfate electrode 19 of the sensor of the invention is connected to terminal C via galvanic connection 18. When in the circuit of this invention any of the sensors of this invention is omitted and electrodes are installed independently, which the method and circuit of this invention also permits, then the reference electrode 19 is placed on the ground surface over the crossing point of pipelines 13 and 15 or buried in the ground as close as possible to pipelines 13 and 15, the latter being more convenient for measurement. The positive pole of milliammeter 20 is connected to terminal F of the test station 6, the negative pole of said milliammeter being connected to terminal E. Variable resistor 21 and switch 22 are connected in series across terminals A and G. Terminals F and B are interconnected via galvanic connection 23 (see FIG. 2) and so are terminals B and G via galvanic connection 24.

Ohmmeter 35 is connected in parallel with milliammeter 20. High-resistance recording voltmeter 25 is connected at measuring point 3 and 4. Ammeter 36 is connected at measuring point 2. Terminals D and E of the test station 6 are interconnected via galvanic connection 34 (FIG. 2).

The drainage (interference) current is measured with the cathodic protection on by means of milliammter 20, measurements being taken with switch 22 off as well as with switch 22 on and variable resistor 21 set for zero drainage (interference) current. The interference bond at test station 6 comprises galvanic connections across terminals B—G—A, including variable resistor 21 and switch 22.

If the structure suffering from interference 15 is exposed to stray current originating, for instance, from a d.c.-electrified track system, the positive pole of said system being in the overhead line, and if the pipeline 15 has an anodic zone and the interfering pipeline 13 a cathodic zone at the crossing point, measurement proceeds with the following deviations from the case described above: the positive pole of a recording milliammeter 20 is connected at measuring point 5 according to FIG. 1 to terminal F of the test station 6 according to FIG. 2, the negative pole being connected to terminal E. In addition, the positive pole of a high-resistance recording voltmeter 25 is connected at measuring point 3 according to FIG. 1 to terminal C of the test station 6 according to FIG. 2, the negative pole of said voltmeter being connected to terminal B. Instead of being under the influence of the cathodic protection installation 10, 1, 7, 9, 8, the pipelines 13, 15 are exposed to dynamic stray currents.

The drainage (interference) current (galvanic currents being negligible in this case) is measured using the recording milliammeter 20, measurements being taken with switch 22 off as well as with switch 22 on and with variable resistor 21 set so as to obtain zero average value of total current flowing through said milliammeter over a preselected time interval, e.g. 24 hours. Simultaneously, the potential between the pipeline exposed to interference 15 and the soil is continuously measured with respect to copper sulfate reference electrode 19 using high-resistance recording voltmeter 25. When evaluating the measurements, the average zero value of the total current flowing through recording milliammeter 20 is compared with the average potential value. According to field measurements carried out under diverse conditions the zero value of total current corresponds to potential in the range from −0.75 V to −0.80 V with respect to the copper sulfate electrode. When the potential is more negative than −0.80 V, the pipeline is already partially cathodically protected. It is usually reasonable to reduce the resistance value of the interference bond by a small amount to remove the anodic area at pipeline 15. It is of course necessary to carry out complex measurements encompassing diverse operating conditions of the traction substations or of other sources of stray currents.

The attached FIG. 3 shows a circuit diagram for the method of eliminating or mitigating interference in accordance with this invention using the circuit is illustrated in FIG. 1 and FIG. 2; solid lines in FIG. 3 designate current paths through metal, while dashed lines designate current paths through electrolyte (soil). The connection according to FIG. 3 is electrically represented by a bridge circuit with two parallel arms in the bridge circuit current path between nodes 26 and 27. Node 26 designates the point of maximum exposure of the foreign pipeline 15 to interference. Node 27 designates the point of maximum acceptance of the drainage (interference) current by cathodically protected pipeline 13 from node 26. The protective current is also accepted from node 27 directly from its source, i.e. from the auxiliary anode (groundbed) 8, via electrolytic current path 28.

The drainage (interference) current flowing through the bridge electrolytic current path 29 from node 26 to node 27 is the sum of all drainage currents except the drainage current flowing to node 27 via auxiliary metal electrode 27. Between nodes 26 and 27, the minimum resistance is in the electrolyte; it is, in fact, the resistance of the drainage path from the interfered pipeline 15 through the electrolyte to the interfering pipeline 15 through the electrolyte to the interfering pipeline 13. Similarly, resistance 31 represents the effective resistance of the path interfered pipeline 15/electrolyte, while resistance 32 is the effective resistance of the path interfering pipeline 13/electrolyte. Resistance 33 represents the effective resistance of the path auxiliary metal electrode 17/electrolyte/interfering pipeline 13. This arm of the bridge circuit conducts the drainage (interference) current from the node of the auxiliary metal electrode 17 through the electrolyte to node 27. Simultaneously, however, a galvanic current is superimposed, being generated by a galvanic cell the existence of which is the result of different polarization of metallic surfaces at nodes 17 and 26 after galvanic interconnection of the auxiliary metal electrode 17 and the interfered pipeline 15 by means of cables 14 and 16.

The area of the auxiliary metal electrode 17 is always at least 30 to 100 times less than the area of the exposed metallic surface at coating holidays of the interfered pipeline 15. Consequently, the circuit as shown in FIG. 3 has practically no influence on the current conditions between nodes 26 and 27 or in current path 28.

With the variable resistor 21 set to an appropriate value and with switch 22 on, the flow of drainage/interference/current through path 29 as well as the current flow in the direction node 17–node 27 are reduced to zero or, with the variable resistor 21 set to a still lower value, the current flow direction is reversed, causing also the interfered pipeline 15 and the auxiliary metal electrode 17 to be partially cathodically protected, because the voltage across the two resistances 30, 33 is the same in parallel connection and the current flow is inversely proportional to effective resistances 30, 33. With switch 22 on, however, additional galvanic current is superimposed, being generated by a galvanic cell the existence of which results from unequal polarization of metallic surfaces at nodes 17 and 27 after the auxiliary metal electrode 17 has been galvanically connected with the interfering (cathodically protected) pipeline 13. Consequently, the following current value may be measured with milliammeter 20 at measuring point 5:

$$I_m = I_i + I_{PQ} - I_{OQ} \qquad (A) \; (1)$$

where $I_i$.....drainage (interference) current $I_{PQ}$....galvanic current flowing between the interfered (foreign) pipeline 15 and auxiliary meal electrode 17.

$I_{OQ}$....galvanic current flowing between the interfering (protected) pipeline 13 and auxiliary metal electrode 17.

Field measurements have revealed the values of the off-potential (polarization potential) to be usually within the following limits: interfering pipeline 13 (steel surface O):

$$U_{O(off)} = -0.80 \text{ to } -1.10 \; V$$

interfered pipeline 15 (steel surface P):

$$U_{P(off)} = -0.50 \text{ to } -0.75 \; V$$

auxiliary metal electrode 17(steel surface Q):

$$U_{Q(off)} = -0.70 \text{ to } -1.00 \; V$$

When assuming that $U_{O(off)} = -0.90$ V and $U_{P(off)} = -0.60$ V, then for $U_{Q(off)} = -0.75$ V the galvanic current is zero, since according to equation (1):

$$I_{PQ} - I_{OQ} = \frac{U_{P(off)} - U_{Q(off)}}{R_{PQ}} - \frac{U_{Q(off)} - U_{O(off)}}{R_{OQ}} = \qquad (2)$$

-continued $$= \frac{1}{R_{PQ}} (-0.60 \div 0.75 + 0.75 - 0.90) = )$$

provided that $R_{PQ} \approx R_{OQ}$ where $R_{PQ}$ is the effective resistance (via electrolyte) between structures P and Q, i.e., between the interfered pipeline 15 and the auxiliary metal electrode 17

$R_{OQ}$ is, by analogy, the effective resistance between the interfering pipeline 13 and electrode 17

The example that follows illustrates in detail the method and connection for mitigating interference in accordance with this invention.

EXAMPLE

The procedure for mitigating the adverse effects of interference is shown in the following example.

(a) An automatic current interrupter 1 with an interrupting cycle of, for instance, 10 seconds ON and 5 seconds OFF is connected in series into the rectifier circuit 7 of the cathodic protection facility.

(b) Under normal operation, the auxiliary electrode 17 is galvanically connected with the cathodically protected pipeline 13, i.e., terminals D and E at the test station 6 are interconnected by galvanic connection 34, while the galvanic connection 23 between terminals F and B is removed. Prior to further measurements of electric values for the purpose of mitigating the interference effects, the galvanic connecton 34 and the surface of the auxiliary metal electrode 17, e.g. a circular steel plate with one side insulated and with surface area S=100 cm², is allowed to depolarize as necessary, for instance, for a period of 30 minutes. Next, a high-resistance voltmeter 25, with its positive pole connected to terminal C and its negative pole to terminal E of the test station 6, is used to measure the off-potential of the auxiliary metal electrode 17 with respect to the copper sulfate reference electrode 19, the value obtained by measurement (for steel surface Q of electrode 17) being, for inst., $U_{Q(off)} = -0.85$ V (the value measured immediately after the removal of galvanic connection 34 being $U_{Q(off)} = -0.97$ V).

(c) With the switch 22 off and the milliammeter disconnected, ohmmeter 35 is connected at measuring point 5 across terminals E and F of the test station 6. The measured value of resistance 33 between the auxiliary steel electrode 17 (steel surface Q) and the foreign pipeline 15 (steel surface P) is practically equal to the ground resistance of the steel electrode 17, e.g., $$R_{PQ} = 63 \Omega = R_{OQ}.$$

Similarly, the internal resistance 30 between the interfering pipeline 13 and the interfered pipeline 15 is measured by connecting the ohmmeter across terminals A and B with galvanic connections 23 and 24 removed, the measured value being, for inst., $R_{OP} = 0.34 \Omega$. After this measurement, the circuit should be restored to its original state.

(d) Meanwhile, the current interrupter 1 is set into operation and with the switch 22 permanently off, the value of the off-potential (during the interval when the cathodic protection is off) of the interfering structure to soil is measured against the copper sulfate reference electrode 19. The positive pole of the high-resistance voltmeter 25 is connected to terminal D, the negative pole being connected to terminal D. The value measured is, for inst., $U_{O(off)} = -0.95$ V.

(e) Under conditions identical with those of the preceding paragraph the value of the off-potential of the interfered structure 15 to soil is measured at measuring point 3. The value measured is, for inst., $U_{P(off)} = -0.66$ V.

(f) A check calculation of the galvanic current values is now carried out according to relation (2):

$$I_{PQ} - I_{OQ} = \frac{-0.66 + 0.85}{63} - \frac{-0.85 + 0.95}{63} =$$

$$+ \frac{0.09}{63} = +0.00143 \text{ A}$$

For the galvanic current to be zero, the potential $U_{Q(off)}$ would have to attain the value $U_{Q(off)} = -0.66 - 0.95/2 = -0.805$ V. If the depolarization—or polarization in the case of reverse connection (e.g., when using a storage battery), i.e. with auxiliary metal electrode 17 as anode and pipeline 13 as cathode—should fail to continue, the difference $$I_{PQ} - I_{OQ} = I_g \quad (3)$$

will have to be considered in equation (1). In the present case $I_g = +0.00143$ A. Then the drainage (interference) current resulting from relations (1) and (3) is $$I_i = I_m - I_g \quad (4)$$

and for $$I_i = 0: I_m = I_g \quad (5)$$

(current $+I_g$ flows in the direction pipeline 15—milliammeter 20 —auxiliary metal electrode 17).

(g) For the purpose of checking, ammeter 36 is connected in series at measuring point 2, the positive pole of this ammeter being connected to terminal B and its negative pole to terminal G with the galvanic connection 24 removed. The milliammeter 20 is connected in series with its positive pole to terminal F and its negative pole to terminal E with the galvanic connection 23 in position. The variable resistor 21 is set to position $R_v = \max$. The switch 22 is then turned on. The variable resistor 21 is moved in the direction of lower resistance values while observing the change in the current flowing through the milliammeter 20 (where the current is decreasing) and through the ammeter 36 (where the current is increasing), in either case in the interval with the cathodic protection on. When the value $I_m = I_g$ has been attained, in the given case $I_g = +1.43$ mA (as measured by milliammeter 20) and the current flowing through the interference bond $I_2 = 0.92$ A (as measured by ammeter 36). The initial current values with the cathodic protection on and the switch 22 off in the present case were $I_2 = 0$, $I_m = 15.6$ mA and therefore $I_i = I_m - I_g = 15.6 - 1.43 = 14.17$ mA. The variable resistor is thus set in the correct position. The ratio $$\frac{I_i}{I_2} \cdot 100 = \frac{0.01417}{0.92} \cdot 100 = 1.55\%$$

and the ratio $$\frac{I_g}{I_i} \cdot 100 = \frac{1.43}{14.17} \cdot 100 = 10\%$$

(h) For the purpose of checking, the potential of the interfered pipeline 15 to soil may be measured against the copper sulfate electrode 19 with the cathodic protection ON and the interference bond in operation (i.e., with variable resistor 21 set and switch 22 on). At measuring point 3, the high-resistance voltmeter is connected with its positive pole to terminal C and its negative pole to terminal B. While the initial values were $U_{p\ off} = -0.66$ V and $U_{P\ on} = -0.51$ V (with the cathodic protection on), the setting of the interference bond of this invention causes the value to change to $U_{f\ on}^{b}{}_{on} = -0.68$ V and immediately after opening the switch 22 (but with cathodic protection on) the value is $U_{P\ on}^{b}{}_{off} = -0.53$ V. Since $U_{P\ off} > U_{P\ on}^{b\ on} = -0.66 > -0.68$ (volts), the design is satisfactory.

When one protected pipeline crosses several unprotected ones, the procedure described above is carried out for all these crossings and in the second measuring cycle the variable resistor settings are readjusted so that $I_i = 0$ for all the crossings or that the unprotected pipelines are moderately cathodic in comparison with the state with cathodic protection off.

The advantage of the method and circuit of the invention is in that the setting of the variable resistor in the interference bond may be effected more accurately and readily than by using any of the methods presently known and in that elimination or mitigation of interference may be achieved by raising the output of the cathodic protection facility no more than absolutely necessary. The ultimate results are savings in operators' time, electric power and overhead costs. Since cathodic protection test stations (terminal boxes) are usually provided at crossing points with foreign metallic line structures and because these are points where it is reasonable to investigate polarization potential values of structures provided with cathodic protection, auxiliary steel electrodes in the form of a sensor buried in the ground for investigating the efficiency of the cathodic protection may be utilized for the purpose of elimination or mitigation of interference. Where no auxiliary metal electrode or sensor is installed in the ground, a portable sensor may be used with advantage for measuring the degree of exposure to corrosion. The method of measurement makes it possible to estimate the surface area of the interfered metallic structure which discharges the interference current.

The method and apparatus of this invention may be used for substantially reducing interference on both line and nonline underground metal structures, such as underground storage tanks, provided with external insulating coating or even bare, existing or newly constructed, made of steel, lead, aluminum or other metallic materials.

What is claimed is:

1. A method for substantially reducing adverse electrolytic effects on a metal structure embedded in an electrolyte in the presence of a foreign direct current field by draining the interfering current through a variable resistance galvanic current path, comprising the following steps:
    establishing a galvano-electrolytic current path, in parallel with said galvanic current path,
    permitting a current comprising a portion of the interfering current and galvanic currents due to varying degrees of polarization of metal surfaces, to flow through said parallel path,
    measuring said current flowing through said parallel galvano-electrolytic path, and
    gradually reducing said variable resistance until the current flowing through said parallel galvano-electrolytic path in the direction of the electrolytic portion of said parallel galvano-electrolytic current path is substantially zero.

2. The method of claim 1, further comprising the step of electrochemically adjusting said parallel galvano-electrolytic current path immediately before measurement to make the sum of the galvanic currents arising due to various degrees of polarization of metal surfaces substantially equal to zero.

3. The method of claim 1, wherein said current flowing through said parallel galvano-electrolytic current path flows and is measured over a time interval of several hours, and said variable resistance is gradually reduced until zero average value over said time interval is attained and until the average value of said metal structure to electrolyte potential is more negative than $-0.75$ V as measured by a copper sulfate reference electrode.

* * * * *

UNITED STATES PATENT OFFICE
CERTIFICATE OF CORRECTION

Patent No. 4,152,228          Dated May 1, 1979

Inventor(s) Josef Polak

It is certified that error appears in the above-identified patent and that said Letters Patent are hereby corrected as shown below:

Column 3, line 37: Before "portion" insert --an aliquot--.

Column 4, line 56: "milliammter" should be --milliammeter--.

Column 7, line 30: "connecton" should be --connection--.

Signed and Sealed this

Twenty-third Day of October 1979

[SEAL]

Attest:

RUTH C. MASON
Attesting Officer

LUTRELLE F. PARKER
Acting Commissioner of Patents and Trademarks